United States Patent [19]
Steinmetz et al.

[11] Patent Number: 5,687,996
[45] Date of Patent: Nov. 18, 1997

[54] MOLDED PART MADE OF THERMOPLASTIC MATERIAL

[75] Inventors: Hans-Werner Steinmetz; Helmut Hilger, both of Schaffhausen; Dirk Alexander Petry, Feuerthalen, all of Switzerland

[73] Assignee: Georg Fischer Rohrleitungssysteme AG, Schaffhausen, Switzerland

[21] Appl. No.: 582,169

[22] Filed: Jan. 2, 1996

[30] Foreign Application Priority Data

Jan. 11, 1995 [DE] Germany ................. 195 00 579.1

[51] Int. Cl.⁶ ................................................. F16L 47/02
[52] U.S. Cl. ..................... 285/21.1; 285/23; 285/242
[58] Field of Search ........................... 285/21.1, 21.2, 285/364, 365, 406, 409, 915, 242, 252; 219/544, 535

[56] References Cited

U.S. PATENT DOCUMENTS

| | | | |
|---|---|---|---|
| 3,828,403 | 8/1974 | Perrin et al. | 285/409 X |
| 4,770,442 | 9/1988 | Sichler | 285/21.2 |
| 4,915,417 | 4/1990 | Sarno et al. | 285/21 |
| 4,927,183 | 5/1990 | Steinmetz et al. | 285/21.2 |
| 5,252,810 | 10/1993 | Trösch et al. | 219/544 |

FOREIGN PATENT DOCUMENTS

| | | | |
|---|---|---|---|
| 6-2797 | 1/1994 | Japan | 285/21 |

Primary Examiner—Terry Lee Melius
Assistant Examiner—Heather Shackelford
Attorney, Agent, or Firm—Bachman & LaPointe, P.C.

[57] ABSTRACT

A molded part has welding sleeve portions (2) which are each provided with a heating coil (3a, 3b) for joining to tubular parts. A cylindrical sleeve end part (7) can be tensioned by at least one tensioning system against the inserted tubular part, thus providing fixing and holding of the parts before welding and during welding.

7 Claims, 2 Drawing Sheets

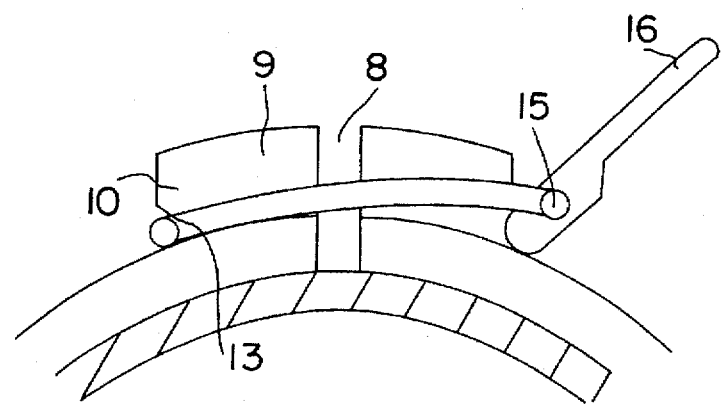
F I G. 3
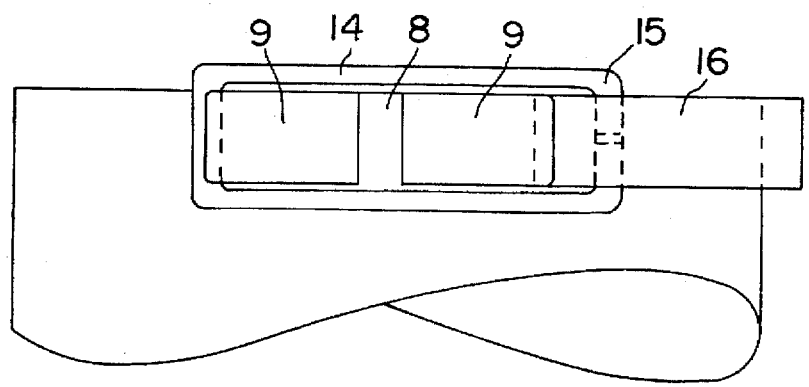
F I G. 4
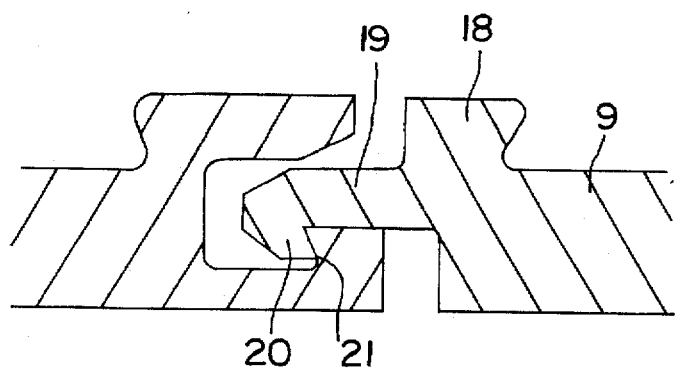
F I G. 5

MOLDED PART MADE OF THERMOPLASTIC MATERIAL

BACKGROUND OF THE INVENTION

The invention relates to a molded part made of thermoplastic material, as described in the preamble of claim 1.

From EP-A1-0 253 966 there is known a molded part of the above type which, for pre-fixing the tube inserted into the molded part in the axial direction and for eliminating radial play, has a tensioning element which is either formed as a tensioning nut with a conical clamping part or as a tensioning strip or tensioning strap arranged on the outer circumference of the sleeve or socket part. The wire ends of the heating device, which comprises two sheet heaters connected in parallel to each other, lead out of the front end of the molded part. Because of the space requirement of the tensioning element the arrangement of a fixed plug connection on the outer circumference of the sleeve for speedy connection to a welding device is either not possible or is only possible by extending the molded body.

In EP 0 525 339 there is described a molded part which is suitable for connecting to tubular parts. A cylindrical clamping part is provided with slots and screws arranged in flanges, whereby a welding sleeve part can be clamped radially by means of screws against the inserted tubular part. It is therefore possible to fix and hold the parts before welding and during welding. Since the screws have to be screwed into the flanges with a tool, a great deal of time is required for assembly. In addition this type of fixing is not suitable for larger tube diameters.

SUMMARY OF THE INVENTION

It is the aim of the present invention to produce a molded part of the above type with which it is possible to secure the tube with simple means, and the fixture can be applied in a very short time and is also suitable for larger diameters.

This aim is achieved by the characterizing features of claim 1.

Particularly advantageous developments of the invention can be seen in the dependent claims.

The features of the invention make possible the simple construction of the tensioning system necessary for fixing and clamping the inserted tube before welding. A tensioning element is arranged on the tensioning system and remains at least during the welding process. By arranging tensioning elements designed, for instance, as tensioning brackets the fixing and clamping can be carried out without any other tool and in the shortest possible time. It is also advantageous that the tensioning system can, for instance, be of compact construction and be used for various products. A further advantage is that similar materials can be used. This means that the tensioning element, like the molded part, can be made of a thermoplastic plastic. The tensioning element can be removed after welding and used again. It is also advantageous that fixing can thereby be effected without problems, even with large tube dimensions. As an alternative to removal of the tensioning element, clamping elements which are integrated into the molded part can also be used.

Preferred exemplary embodiments are described below with reference to the attached drawings. These show:

BRIEF DESCRIPTION OF THE DRAWINGS

FIG. 3 an enlarged representation of the tensioning system of FIG. 2;

FIG. 4 a plan view of FIG. 3; and

FIG. 5 a further type of construction of a tensioning system in a side view.

DETAILED DESCRIPTION OF THE PREFERRED EMBODIMENTS

Figure 2:
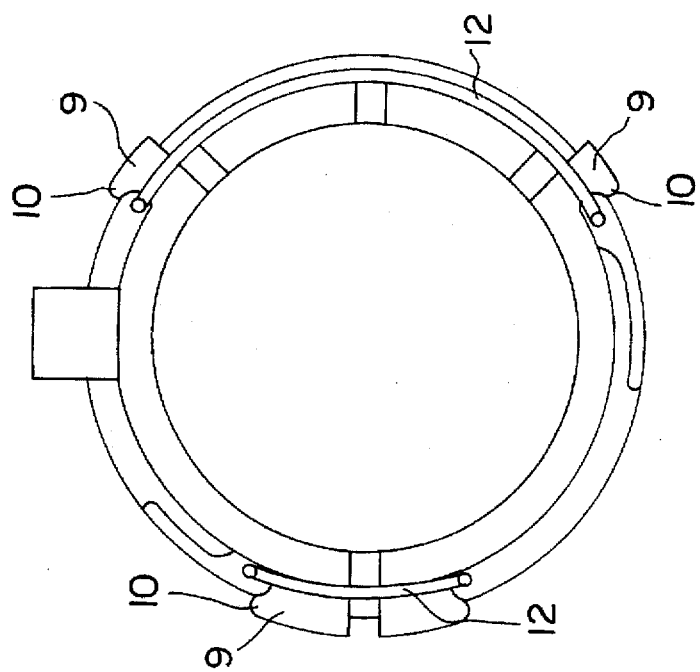
FIG. 2 an elevated end view of the molded part shown in FIG. 1.
Figure 1:
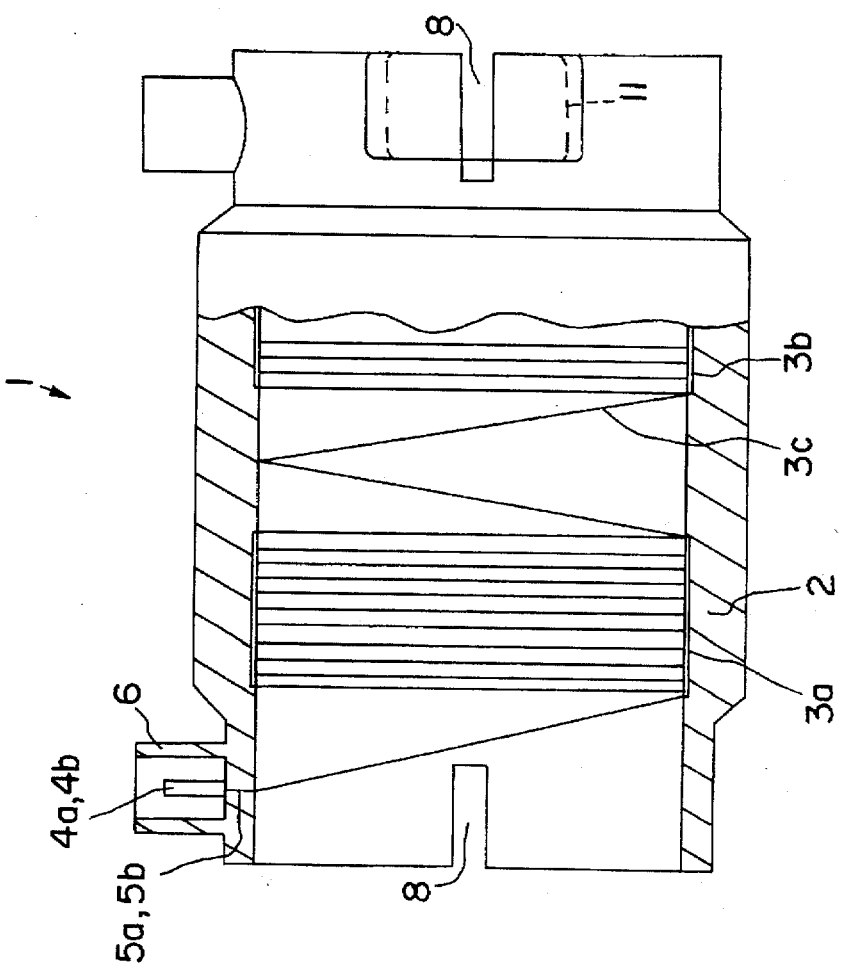
FIG. 1 is a side elevation view of a molded part constructed as a sleeve with portions thereof shown in cross-section with tensioning systems arranged on the sleeve.

FIGS. 1 and 2 show a molded part 1 made of thermoplastic material and constructed as a sleeve for joining two tubes by means of welding by an electrical heating device.

For each tube to be joined the molded part 1 has a welding sleeve portion 2, on the inner circumference of which there is arranged a spirally wound heating spiral coil 3. According to FIG. 1 two heating coils 3a, 3b are arranged with an axial spacing from each other and joined together by a winding 3c with a larger pitch. The heating coils 3 comprise a resistance wire, insulated by a heat-resistant layer, which is additionally enclosed by a thermoplastic material corresponding as far as possible to the material of the molded part.

The front end 5a of the heating coil 3a is connected to a plug contact 4a arranged on the outer circumference of a sleeve end, and the rear end 5b of the heating 35 coil 3b is connected to a plug contact 4b, the two plug contacts 4a, 4b being arranged adjacently, protected in a box-shaped wall 6 of the molded part 1.

In FIG. 2 a tensioning system is arranged between the front end of the sleeve and the heating coil. Arranged on the circumference are two tensioning systems which are opposite each other. One tensioning system has a longitudinal slot 8 on the sleeve. Protuberances 9 are disposed on both sides of the slot, starting at the slot 8, and protrude outwardly from the sleeve. A projection 10 is arranged at the other end of one protuberance 9. In the longitudinal direction the projection 10 has a surface 11 on which are fitted tensioning elements 12. In FIG. 2 the tensioning element 12 encompasses several slots 8.

Instead of slots 8 between the front end of the sleeve and the heating coil, the wall thickness of the molded part can also be thinner than in the middle of the molded part in order to allow pressing of the sleeve end against the tube part. In addition one or more tensioning systems can be arranged around the circumference on the sleeve end. With larger tube dimensions it is advisable to arrange several tensioning elements. The tensioning elements can be made of a plastic or a metallic material.

Instead of the tensioning elements described, clamping tongs or screw clamps can also be fitted which also can be removed again without any trouble after the welding process and can be used for another welding sleeve connection.

An enlargement of the tensioning system of FIG. 2 is shown in FIGS. 3 and 4. The projection 10 of protuberance 9 has an undercut 13. The contour of this undercut 13 is semi-circular and a tensioning element in the form of a wire strap can be inserted in it. A closed wire loop 14 is hingedly connected at one end by means of a hinge connection 15 to a lever 16. The wire loop 14 has a shape corresponding to the undercut 13 so that it can be inserted in this and encloses both protuberances 9. The lever 16 engages with its shorter arm in the other undercut 13. By pressing on the longer arm of the lever 16 the shorter end rests on the undercut 13 and draws the wire loop 14 over both protuberances 9 via the hinge connection 15. At the same time the inner diameter of the sleeve is reduced at the sleeve end and the inserted tube is fixed on or in the sleeve. The wire loop can also be of longer construction in order to enclose a larger circumferential region of the sleeve end.

FIG. 5 shows a further type of embodiment of a tensioning system which is integrated in the sleeve body. One of the two parts of a snap connection 18 has a clip 19 with a dog 20. The clip 19 is fixedly arranged on the sleeve. Arranged in the opposite region of the snap connection 18 is an engagement surface 21. If the sleeve end is compressed in diameter the dog 20 of the clip 19 engages into the engagement surface 21. The inner diameter on the end of the sleeve is reduced and the tube part is fixed on the sleeve.

Since the snap connection system 18 is arranged fixedly on the sleeve no further components are necessary.

The molded part 1 can also be constructed as a T-piece, a corner, a curve or a reducing socket, it being possible to arrange tensioning systems at each end of the sleeve.

We claim:

1. Molded part made of thermoplastic material having at least one welding sleeve part having a plug-in end and an electrical heating coil for connecting the molded part to a tubular part, wherein the plug-in end of the welding sleeve part can be brought into abutment with the tubular part in a fitting manner, the improvement which comprises means for forming a connection between the tubular part and the welding sleeve part, said means comprises at least one tensioning system located on the plug-in end of the welding sleeve part, said tensioning system comprises at least one axially extending slot provided on said plug-in end, a pair of protuberances provided on said plug-in end on either side of said at least one recess and a tensioning element located on said pair of protuberances and bridging said slot.

2. Mold part according to claim 1 wherein said tensioning element is removable from said protuberances.

3. Mold part according to claim 3 wherein said protuberances are provided with at least one projection surface and said tensioning element engages said at least one projection surface.

4. Mold part according to claim 3 wherein said at least one projection surface has an undercut and said tensioning element engages said undercut.

5. Mold part according to claim 4 wherein said tensioning element is formed as a closed wire loop which engages said undercut.

6. Mold part according to claim 5 wherein said closed wire loop is provided with a lever means for drawing said protuberances toward each other.

7. Mold part according to claim 1 wherein said protuberances are positioned on a circumferencial surface of said plug-in end.

* * * * *